INVENTORS
MICHAEL WIENAND
KLAUS JENSEN
FRANZ PRIMESSING
FRANZ-WERNER ALFTER

BY

ATTORNEYS

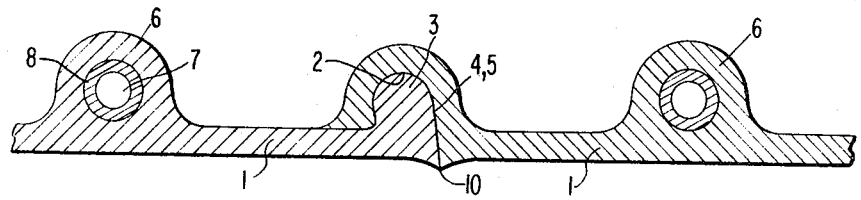
FIG.7
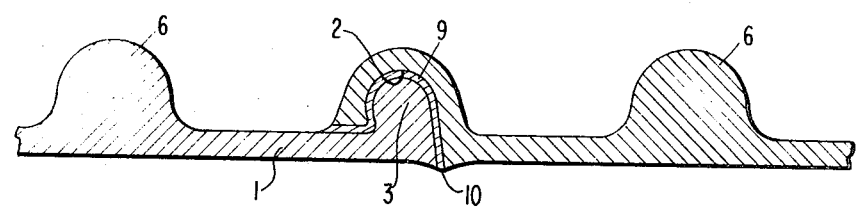
FIG.8
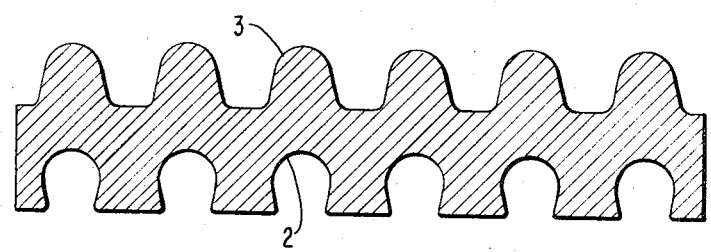
FIG.9
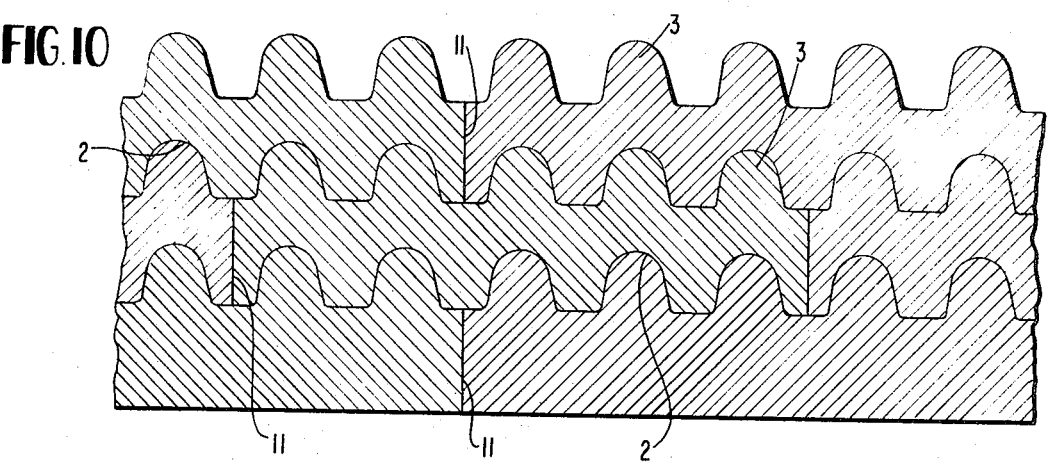
FIG.10
FIG.11
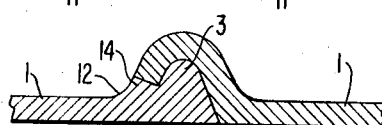
FIG.12
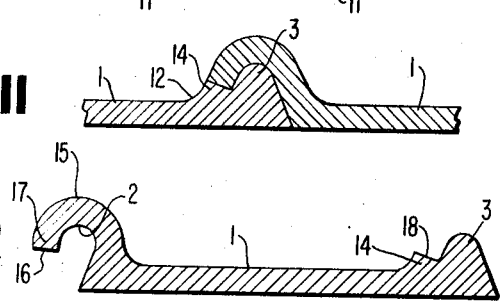
INVENTORS
MICHAEL WIENAND
KLAUS JENSEN
FRANZ PRIMESSING
FRANZ-WERNER ALFTER
BY *Craig, Antonelli, Stewart & Hill*
ATTORNEYS

United States Patent Office 3,679,531
Patented July 25, 1972

3,679,531
SHAPED SECTION OF A THERMOPLASTIC
SYNTHETIC MATERIAL
Michael Wienand, Siegburg, Klaus Jensen, Buisdorf, Franz Primessing, Mondorf, and Franz-Werner Alfter, Oberlar, Germany, assignors to Dynamit Nobel Aktiengesellschaft, Troisdorf, Germany
Filed Apr. 7, 1969, Ser. No. 813,834
Claims priority, application Germany, Apr. 5, 1968, P 17 78 201.3; Aug. 5, 1968, P 17 75 379.6
Int. Cl. A44b 21/00
U.S. Cl. 161—48
16 Claims

ABSTRACT OF THE DISCLOSURE

The present disclosure is directed to a shaped section of a thermoplastic synthetic material containing at least one tongue portion and at least one groove portion for mutual joining or for further joining said section with similarly shaped sections containing identical tongue and groove portions wherein the cross-sectional configurations of said tongue and groove portions are adapted to each other such that upon interlocking with each other, they are deformed and pressed together in a flush union along their entire surface.

BACKGROUND OF THE INVENTION

The present invention relates to a shaped section or profiled element made of a thermoplastic synthetic material. More particularly, the present invention is directed to the manufacture of stripped-wound or coiled pipes, sheets, and the like, with, for example, at least one tongue projection extending in the longitudinal direction thereof and a corresponding groove member adapted to receive said tongue projection for joining or connecting shaped sections.

It is conventional to join shaped sections made of a synthetic material by hooking them together at their edges. The zones of the shaped section which form the tongues and grooves are constructed so that they fit accurately together, that is, the cross sectional shape of the tongue corresponds exactly to that of the groove. In cases where it is not intended to merely hook the parts together mechanically, such as by pressing them together or pushing the tongue into the groove, but rather where it is desired to effect a firm surface bond by welding or cementing said surfaces together, the clamping pressure required for this purpose is produced mechanically, that is by holding devices such as rolls, and the like. In this connection, it is of considerable disadvantage that the clamping pressure is effective on the welding surfaces which have been brought to the welding temperature, only for a brief period of time, and is not effective directly after the welding step proper, that is, during the relatively long cooling period. This results in a welding bond which varies substantially in its quality and, in fact, exhibits considerable inherent stresses. Although it would be possible, in the cases where a continuous weld of the shaped sections is not required, to maintain the clamping pressure even during the long period of cooling with the aid of a clamping device, this would entail that the machine would be blocked for a correspondingly long period of time.

SUMMARY OF THE INVENTION

An object of the present invention is to avoid the prior art disadvantages in the joining of shaped sections made of a thermoplastic synthetic material.

Another object of the present invention is to join shaped sections of thermoplastic synthetic materials wherein the welding bond between said materials is high in quality and exhibits no inherent stresses or strains.

A further object of the present invention is to join shaped sections of a thermoplastic synthetic material which does not require the continuous use of a clamping device to produce an effective welding of the elements to be joined.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved bond for shaped sections of thermoplastic synthetic materials may be obtained by providing that the cross sections of the tongue and the groove of the shaped section or sections to be joined together by welding are adapted to each other such that they are deformed upon interengagement with each other and are pressed flush together along the entire surface thereof. In this manner, a clamping pressure is maintained during the entire cooling period between the shaped sections, that is, between the tongue and the groove, even after the clamping pressure exerted by any clamping device which may have been employed has ceased. This is the result of the restoring or resilient forces of the synthetic material which attempts to reestablish its original shape, said forces having an effect until the temperature of said synthetic material falls below its congealing or solidification temperature. This contact or clamping pressure ensures that the welding surfaces which were heated to the required welding temperature, for example by means of hot air, enter into a mutual bond which is firm and intimate at all places and, in particular, free of stresses. Of course, the same holds true in the case where the shaped sections are subjected to cementing, with the aid of an adhesive, rather than welding.

In accordance with another embodiment of the present invention, a firm and intimate, stress-free surface bond between two shaped sections can also be obtained by dimensioning the tongue and the groove for the interposition of an elastic intermediate formed piece made preferably of a constant thickness. This intermediate piece is then welded together with the tongue and the groove. The advantage of this feature resides in the fact that shaped sections welded together in this manner exhibit a certain amount of moveability with respect to each other, so that it would be possible, for example, in the case of a pipe wound from an extruded shaped section, to bend or curve the pipe to a limited degree.

When using a shaped section which is to have only one tongue and one groove, the present invention provides that they are formed alongside the two lateral edges of the shaped section. In this connection, it is possible to have the shaped section or sections abut each other like a butt-joint with their narrow sides, like wooden boards containing a tongue and groove, or to connect the shaped section or sections so that they overlap at their edges. In the last-mentioned construction, the provision can then be made that the mutually overlapping zones of the shaped sections form a bead or ridge with each other, which can provide reinforcement, for example, in connection with a wound-pipe. In this construction, it can additionally be provided that at least one additional bead-like thickened portion is formed between the edges containing the tongue and groove. This thickened portion, which has the effect of a reinforcing or rigidifying means, permits the possibility of shaping the intermediate regions of the shaped section correspondingly thinner. In this connection, the provision can also be made to shape the bead-like thickened portion in such a manner that it exhibits the same configuration as the overlapping marginal zones of the shaped section.

In a further embodiment of the present invention, the bead-like thickened portion of the shaped section can be hollow. This makes it possible, for example, to effect a heating or cooling of the shaped section by using a heat exchange liquid or an embedded heating conductor. For this purpose, the hollow space can also be provided with an insert, for example, a tubular or hose-type lining in order to protect the shaped section, for example, against an aggressive media. However, this lining can also be used just as well for obtaining a higher strength of the shaped section or the structure formed therefrom. In the latter case, the lining is produced, of course, from a material having a correspondingly high tensile strength and/or flexural strength. In case the insert is used for increasing the strength, it is also possible to provide in place of the tubular or hose-type lining, a wire of an appropriate material, for example a metal or a synthetic material having a high strength, which fills the hollow space to a greater or lesser extent.

When a tongue and groove of the shaped sections formed according to the present invention are brought into engagement with each other, a notch is produced at the edge of the part of the shaped section provided with the groove. The disadvantages of such a notch can be counteracted, for example, by having the shaped section, at the edge provided with the groove, tapered into a resilient lip by way of a rounded portion.

In practice, it was discovered that in spite of this favorable configuration of the cross section of the shaped section, when employing notch (impact) sensitive materials, such as polyvinyl chloride, the notch impact resistance values obtained are not too desirable. Thus, in the zone of the notch, there remains a spot which may be susceptible to stress. This disadvantage can be eliminated by forming a shoulder-like indentation or offset step portion on the inwardly disposed side of the tongue and by making the free edge of the corresponding hook-shaped portion of the shaped section provided with the groove, of such a configuration and dimension that, upon interlocking of the groove and the tongue, said edge fittingly contacts its front face with the shoulder-like indentation. In this manner, a substantially larger cross section is obtained at the point of transition from the flat portion of the strip-like shaped section to the bead-like thickened portion, in the zone of mutual interconnection of the groove and the tongue. Accordingly, the danger point at this location is considerably lower. It is particularly advantageous to make the height of the shoulder-like indentation approximately equal to the wall thickness of the flat part of the shaped section.

The thermoplastic synthetic materials which can be used to produce the shaped sections according to the present invention include polyolefins, for example polyethylene and polypropylene, polystyrene, polyvinyl materials, for example polyvinyl chloride, polyvinylidene chloride, polytetrafluoroethylene, and the like, polyesters, for example polymethyl methacrylate, nylon, cellulose materials, for example, cellulose nitrate, cellulose acetate, cellulose acetate butyrate, ethyl cellulose, and like compounds. The elastic intermediate formed piece which may be used in one of the embodiments of the present invention can be any of the materials mentioned above as well as synthetic rubbers and any other material which exhibits a certain amount of flexibility or bendability.

BRIEF DESCRIPTION OF THE DRAWINGS

The present invention will become more fully understood from the detailed description given hereinbelow and the accompanying drawings, which are given by way of illustration only and thus are not limitative of the present invention and wherein.

FIG. 7 shows a shaped section in accordance with FIG. 1, wherein a tubular insert is arranged in the bead-like thickened portion of the shaped section;

FIG. 8 shows a bonding of shaped sections with the use of an intermediate layer;

FIG. 9 shows a shaped section provided with grooves and tongues along its two plane surfaces;

FIG. 10 shows the use of the shaped section of FIG. 9 for a multilayered structure;

FIG. 11 shows the junction point of a strip-like shaped section provided with a shoulder-like indentation or offset step portion; and FIG. 12 is a cross section through the strip-like shaped section of FIG. 11.

DESCRIPTION OF THE PREFERRED EMBODIMENTS

Figure 1:
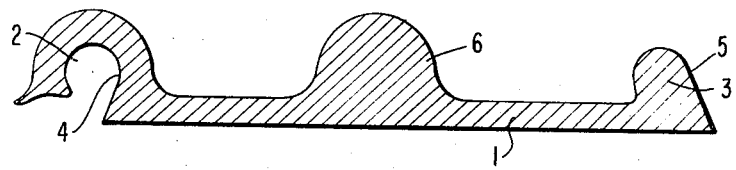
FIG. 1 shows a shaped section suitable for the manufacture of strip-wound pipes.

Referring now to the drawings, wherein like reference numerals are used throughout the various views to designate like parts, the shaped section 1 of FIG. 1 is provided on one edge with the groove 2 and at its other edge with the tongue 3. The flanks 4 and 5 of the groove and tongue are oppositely inclined with respect to each other, and the cross section of the groove and tongue is formed and dimensioned in such a manner that when the tongue is pressed into the groove in accordance with FIG. 2, the groove is deformed, and the groove and tongue are pressed flush together by a clamping effect along the entire surface thereof. Consequently, when the corresponding surfaces are heated to the required welding temperature prior to pressing the groove and tongue into each other, or together, there results a firm and intimate bond between the surfaces, especially since the tendency of the deformed material to return to its previous shape remains in effect during the entire cooling period.

In this embodiment, the bead-like thickened portion 6 shown approximately in the center of the shaped section 1 exhibits about the same configuration and the same dimensions as the edge of the shaped section provided with the groove 2. Depending upon the requirements, particularly the strain on the shaped section, or the article manufactured therefrom, as well as the width of the shaped section, the thickened portion can, of course, be shaped and dimensioned differently, or it can be entirely omitted.

Figure 3:
FIGS. 3 to 6 show another embodiment of the present invention which is similar to FIGS. 1 and 2, wherein two differently formed shaped sections are utilized.
Figure 4:
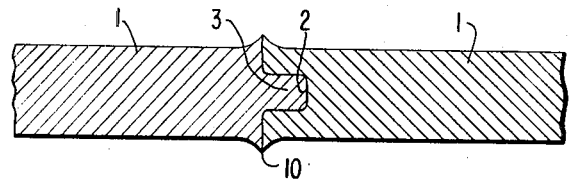

In the shaped section of FIGS. 3 and 4, the groove 2 and the tongue 3 are disposed at the narrow sides of the shaped section 1, said shaped section being constructed as a smooth planar strip or sheet. The lateral portions of the groove and tongue are again formed with opposing inclinations, so that, upon interlocking of the groove and tongue, the desired deformation and consequently the desired clamping pressure due to the clamping effect is obtained.

Figure 5:
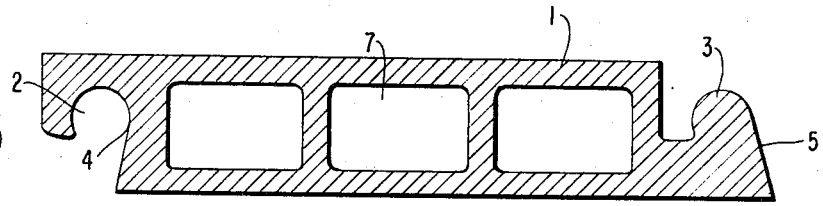
Figure 6:
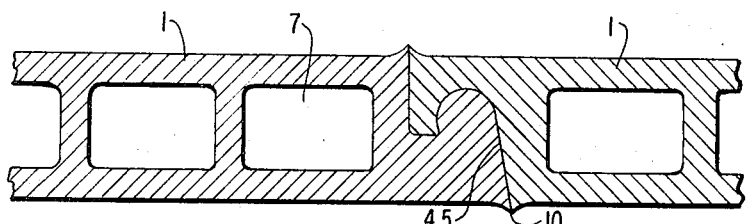

Corresponding considerations also apply with reference to the shaped section 1 of FIGS. 5 and 6, which section is formed as a box-shaped profile with several hollow spaces 7 and is provided at its end portions with a groove 2 and a tongue 3 similarly as the shaped section of FIG. 1. If necessary, hollow spaces 7 can, of course, serve a constructive purpose, for example for conducting media therethrough, or for accommodating other materials having different properties.

In accordance with FIG. 7, a shaped section like that of FIG. 1 is provided with a bead-like thickened portion 6 containing a hollow space 7 which is lined with a pipe or hose 8, manufactured for example, from a synthetic material having different properties. In place of the synthetic material, it would also be possible to introduce into the hollow space 7 a wire or a string, for example of a different synthetic material, or also a metal. The hollow space could also be filled with glass fibers, or the like.

According to FIG. 8, an intermediate layer 9 is disposed between the tongue 3 and the groove 2 of the shaped section or sections 1. The intermediate layer in this case is made of a more or less elastic material, such as a natural or synthetic rubber, soft polyvinyl chloride, polytetrafluoroethylene, and the like. However, it is also possible, for example, to employ an insert made of a textile material. The resiliency of the bond depends on the specific elasticity of the material used for the intermediate layer, and also on the thickness of the intermediate layer. In any event, care must be taken that for the intermediate layer only, such a material is employed which enters into a satisfactory, well-adhering bond with the surfaces of the groove and tongue, and ensures that there will be no separation of the bond in the intermediate layer. The constant thickness for the intermediate layer shown herein is not, of course, a necessary requirement, and thus the thickness of the intermediate layer can also vary.

The projecting protuberances 10 shown at the junction points in FIGS. 2, 4, 6 and 8 can be avoided in an effective manner by dimensioning the groove and tongue appropriately, if such avoidance is desired or required.

The shaped section of FIG. 9 is provided along one of its flat sides (plane surfaces) with identical grooves 2 disposed at uniform spacings, and, on the other flat side in a corresponding fashion with tongues 3. The lateral flanks of the grooves and the tongues are again formed in such a manner that the intended clamping pressure is obtained by pressure interlocking or interengagement due to the deformation which is forceably produced.

As can be seen from FIG. 10, the shaped section of FIG. 9 is especially suitable for the manufacture of structures having two or more layers. In this embodiment, the innermost and/or outermost layer on the outside is suitably of a smooth configuration, unless it is perhaps intended to provide the innermost or outermost layer with grooves and tongues on the outside for anchoring in some type of material, such as for example concrete. As shown in the figure, it is advantageous to arrange the individual layers in such a manner that the joints 11 are offset with respect to one another, so that, for example, when a pipe is wound in several layers in this manner, a complete sealing effect is ensured, even when the joints 11 are not bonded together by welding or cementing.

Figure 2:
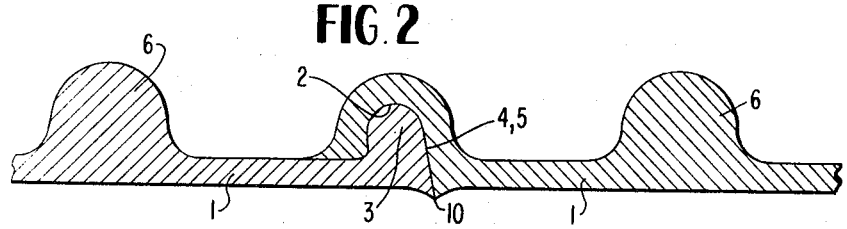
FIG. 2 shows a section from the wall of a pipe wound with the use of the shaped section of FIG. 1.

In the shaped section 1 of a strip form, or in the connection shown in FIG. 2, there results a notch, which impairs the strength, in spite of the rounded portion 12 at point 13. In accordance with FIGS. 11 and 12, this notch is avoided by forming on the inside of the tongue 3 the shoulder-like indentation 14 and providing a rounded portion 12 at the tongue section. The groove section 15 is of such a configuration and dimension that the front face 16 of the free edge 17 fittingly contacts the front face 18 of the indentation 14.

The invention being thus described, it will be obvious that the same may be varied in many ways. Such variations are not to be regarded as a departure from the spirit and scope of the invention, and all such modifications as would be apparent to one skilled in the art are intended to be included.

It is claimed:

1. A profile member of a deformable thermoplastic synthetic material used for the manufacture of strip wound pipes and sheets comprising at least one tongue portion and a corresponding groove portion extending in a longitudinal direction of said profile member for mutually joining or for further joining said member with similarly shaped profile members containing similar tongue and groove portions, the width of each of said groove portions being smaller at the opening side thereof than the corresponding width of each of said tongue portions at the base thereof wherein the mutually corresponding flanks of the groove and of the tongue are fashioned to be inclined in opposite directions so that, when in an interlocking position, the groove portions are permanently deformed by spreading forces and the tongue portions are permanently deformed by compression forces whereby said tongue and said groove portions are pressed together in a flush union along their entire surfaces by a clamping effect.

2. The shaped section of claim 1, comprising at least one tongue portion interlocked in at least one groove portion wherein an elastic element containing a substantially constant thickness is interposed between the contacting surface of the tongue and groove.

3. The shaped section of claim 2, wherein the elastic element is selected from the group consisting of natural or synthetic rubbers, soft polyvinyl chloride and polytetrafluoroethylene.

4. The shaped section of claim 1, comprising only one tongue and one groove wherein the tongue is formed along one edge of the shaped section and the groove is formed along the other edge of said shaped section.

5. The shaped section of claim 4, wherein at least one bead-like thickened portion extending in the longitudinal direction is disposed between the tongue and the groove portions.

6. The shaped section of claim 5, wherein the thickened portion is provided with a hollow space.

7. The shaped section of claim 6, wherein the hollow space is adapted to receive a heat-exchange fluid.

8. The shaped section of claim 6, wherein the hollow space contains an embedded heating conductor.

9. The shaped section of claim 6, wherein the hollow space contains a tubular or hose-type lining.

10. The shaped section of claim 6, wherein the hollow space contains a metal or a thermoplastic synthetic material.

11. The shaped section of claim 1, wherein the shaped section is provided with at least one hollow space.

12. The shaped section of claim 1, wherein said section contains a plurality of tongue portions and a plurality of groove portions on opposite sides of said shaped section.

13. The shaped section of claim 1, wherein the inner side of the tongue portion is provided with a shoulder-like step and the free edge of the groove portion is provided with a corresponding configuration such that upon interengagement, the face of the shoulder-like step of the tongue portion fittingly contacts the free edge of the groove portion.

14. The shaped section of claim 13, wherein the height of the shoulder-like indentation is approximately equal to the wall thickness of the flat part of the shaped section.

15. The shaped section of claim 1, wherein the thermoplastic synthetic material is selected from the group consisting of polyethylene, polypropylene, polyvinyl chloride and polytetrafluoroethylene.

16. A profile member of a thermoplastic synthetic material used for the manufacture of strip-wound pipes and sheets containing at least one tongue portion and at least one groove portion for mutual joining or for further joining said member with similarly shaped profile members containing similar tongue and groove portions wherein the flank portions of the tongue are oppositely inclined with respect to the flank portions of the groove such that upon interlocking with each other, they are deformed and pressed together in a flush union along their entire surface.

References Cited

UNITED STATES PATENTS

| | | | |
|---|---|---|---|
| 2,189,138 | 2/1940 | Eichner | 24—201 X |
| 2,739,089 | 3/1956 | Hageltorn | 161—48 X |
| 3,108,154 | 10/1963 | Cound | 24—201 X |
| 3,347,298 | 10/1967 | Ausnit et al. | 24—201 X |
| 3,389,441 | 6/1968 | Heimberger | 24—205.1 |
| 3,416,585 | 12/1968 | Staller | 24—201 X |
| 3,440,696 | 4/1969 | Staller | 24—201 |
| Re. 24,613 | 3/1959 | Hageltorn | 161—48 X |

ROBERT F. BURNETT, Primary Examiner

J. C. GIL, Assistant Examiner

U.S. Cl. X.R.

24—201 C; 138—150, 154, 111, 33; 161—49, 139; 165—177; 219—544